Aug. 8, 1967 S. J. HUNT 3,334,881
GEAR TOOTH HARDENING MACHINE INDEXING MECHANISM
Filed July 27, 1964 2 Sheets-Sheet 1
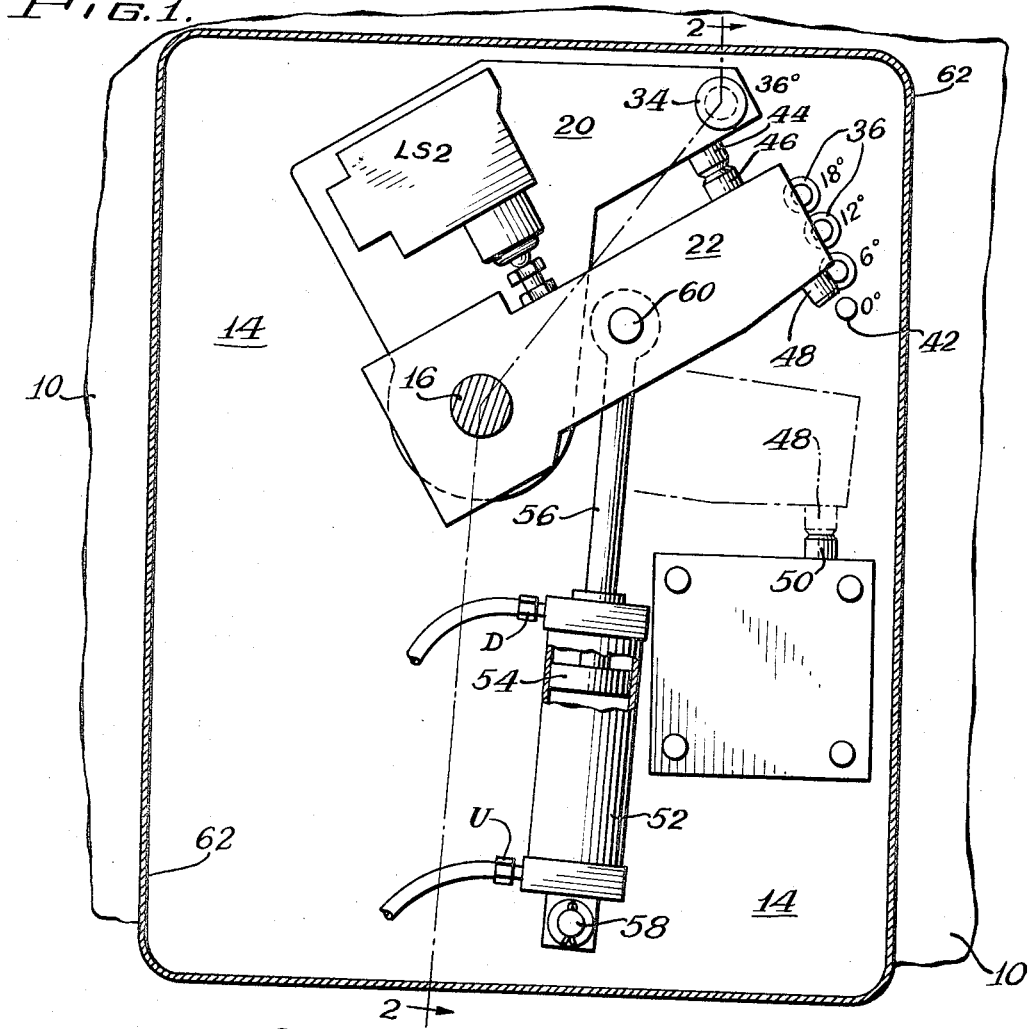
Fig. 1.
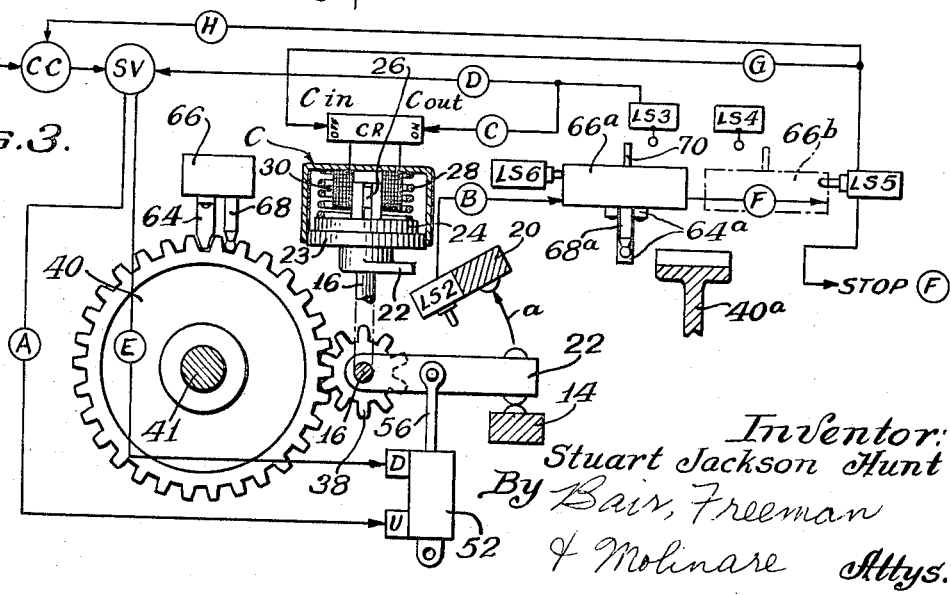
Fig. 3.
Inventor:
Stuart Jackson Hunt
By Bair, Freeman
& Molinare Attys.

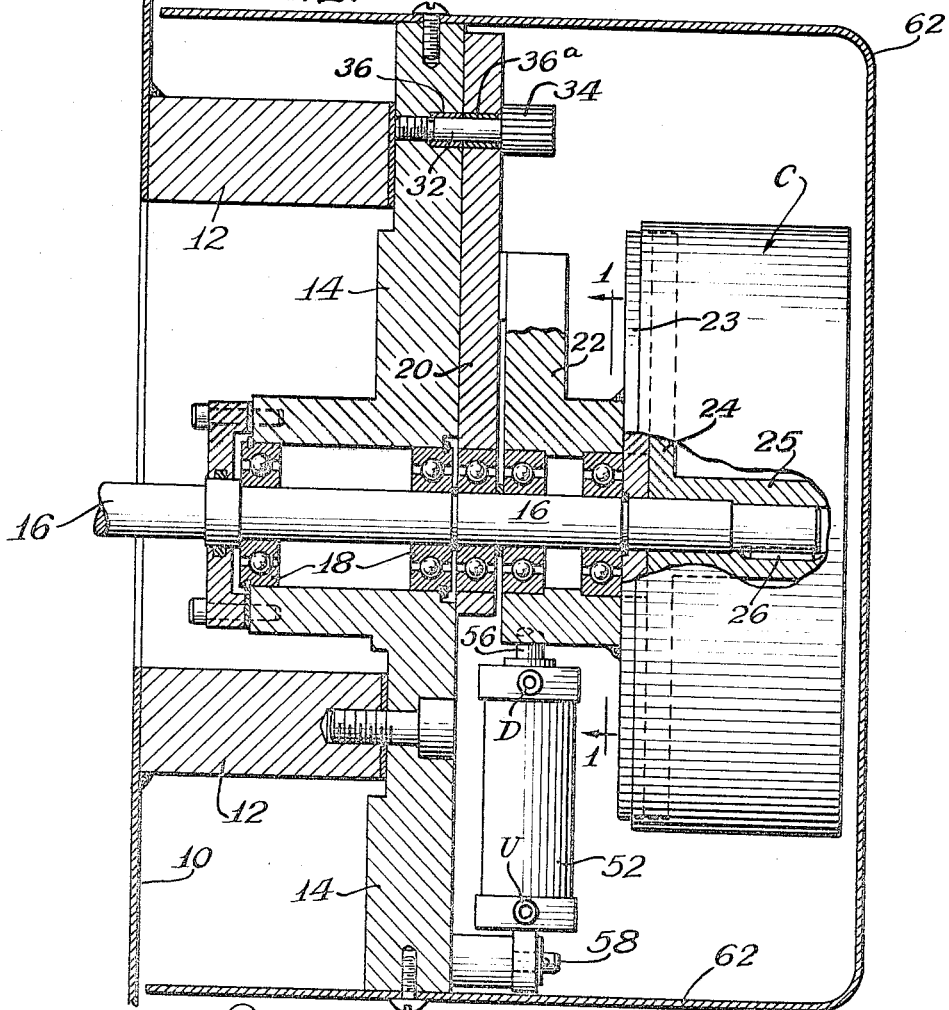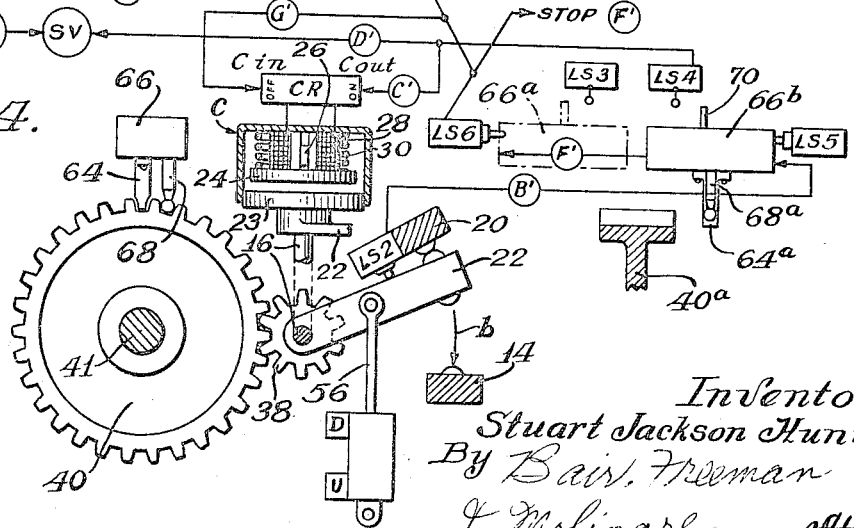

United States Patent Office 3,334,881
Patented Aug. 8, 1967

3,334,881
GEAR TOOTH HARDENING MACHINE
INDEXING MECHANISM
Stuart Jackson Hunt, Richmond, Ind., assignor to National Automatic Tool Company, Inc., a corporation of Indiana
Filed July 27, 1964, Ser. No. 385,405
14 Claims. (Cl. 266—5)

ABSTRACT OF THE DISCLOSURE

Oscillating mechanism to effect tooth-by-tooth indexing of a drive gear meshing with a gear to be hardened tooth-by-tooth. A clutch connecting between the oscillating mechanism and the drive gear is operative as the mechanism oscillates in one direction and inoperative as the mechanism oscillates in the opposite direction. A control system is provided to effect automatic stey-by-step cycling and to stop the cycling when all the teeth of the gear are hardened.

---

This invention relates to indexing mechanism particularly adapted for a gear tooth hardening machine.

One object of the invention is to provide a rugged mechanism for the purpose of indexing work, such as a gear, the teeth of which are to be hardened in the machine; which mechanism efficiently and accurately indexes the gear one or more teeth at a time so that a gear hardening element designed to traverse the width of the gear and thereby the length of the teeth thereof may do so with assured clearance relationship between the hardening element and the trough between two gear teeth.

Another object is to provide means for rotating a "work gear" (a gear whose teeth are to be hardened) at least one tooth at a time, comprising an indexing or drive gear meshing with the work gear, and mechanism for indexing the indexing gear so that any size of work gear with either more teeth or less teeth than the indexing gear may be indexed by the indexing gear by meshing the work gear therewith, the arrangement thus permitting all sizes of work gears to be indexed with but a single adjustment—the distance of the arbor for the work gear with respect to the axis of the indexing gear. Such an arrangement also permits the indexing of work gears having either even or odd numbers of teeth.

Another object is to provide an indexing shaft for the indexing gear which is rotatable, an oscillatable indexing arm and a clutch connection being provided between the indexing arm and the indexing shaft which is operable in one direction of oscillation of the arm and inoperable in the other direction of oscillation thereof so that the oscillation of the indexing arm result in progressive tooth (or teeth)-at-a-time rotation of the indexing gear in only one direction.

Still another object is to provide the indexing arm with stop means to limit the oscillations thereof to that required to rotate the work gear the required number of teeth at a time.

A further object is to provide control means operable to automatically render the clutch operative when the indexing arm is oscillated in one direction and inoperative when oscillated in the other direction.

Still a further object is to provide means for oscillating the indexing arm in the form of pressure fluid operated means and valve means for controlling the flow of pressure fluid with respect thereto.

An additional object is to provide control means for the pressure fluid operated means and the clutch connection which are operable to cycle the traversals of the gear hardening element and the oscillations of the indexing arm, cycle counter means being provided to cause continual recycling until all the teeth of the work gear have been hardened and thereupon operable to stop the gear hardening machine.

Another additional object is to provide limit switches responsive to the traversals of the gear hardening element and to the oscillations of the indexing arm for controlling the clutch connection, the oscillations of the indexing arm and the traversals of the gear hardening element in proper sequential order for hardening either successive or spaced teeth of a gear until all the teeth thereof have been hardened.

With these and other objects in view, my invention consists in the construction, arrangement and combination of the various parts of my indexing mechanism, whereby the objects above contemplated are attained, as hereinafter more fully set forth, pointed out in my claims, and illustrated in detail on the accompanying drawings, wherein:

FIG. 1 is a side elevation of indexing mechanism embodying my invention, a cover therefor being shown in section;

FIG. 2 is a vertical sectional view on the line 2—2 of FIG. 1;

FIG. 3 is a diagrammatic view of my indexing mechanism and control means therefor showing the operations following a cycle start, and FIG. 4 is a similar diagrammatic view showing the operations of the control means at the end of a traversal of the gear hardening element.

On the accompanying drawings I have used the reference numeral 10 to indicate the quenching tank of a gear hardening machine in which the teeth of gears are hardened by the use of high frequency current as will hereinafter be explained. A spacer 12 is welded to the tank 10 and a mounting plate 14 is secured thereto, a suitable gasket being interposed between the two to prevent leakage of quenching liquid.

An indexing shaft 16 is rotatable in bearings 18 supported by the mounting plate 14 as shown in FIG. 2 and has its inner end extending into the tank 10. Rotatable on the shaft 16 adjacent the mounting plate is an index-angle setting arm 20. Next is an indexing arm 22, the arms 20 and 22 being provided with suitable bearings as shown to minimize friction during relative rotation.

On the other end of the shaft 16 an electrically energizable magnetic clutch C is provided of the type which is normally operative, and inoperative when energized. FIGS. 3 and 4 show the clutch diagrammatically in the form of a friction disc 23 secured to the indexing arm 22 and a cooperating friction disc 24 having a hub 25 connected by a slide key 26 with a shaft 16. A clutch spring 30 is illustrated to normally engage the clutch, and an electric coil 28 when energized attracts the hub 25 of the clutch disc 24 against the action of the spring in order to disengage the clutch.

The index-angle setting arm 20 is adapted to be adjusted in its position relative to the mounting plate 14 by means of a pin 32 threaded into the mounting plate as illustrated in FIG. 2 and provided with a knob 34 for this purpose. The mounting plate is provided with a plurality of bushings 36 which may be located at 6°, 12°, 18° and 36° to accommodate an indexing gear. The arm 20 also has a busing 36ª for the pin 32.

An indexing gear 38 is shown in FIGS. 3 and 4 secured to the inner portion of the indexing shaft 16 within the tank 10 which has ten teeth (corresponding to the 36° setting for one tooth at a time) and meshes with a work gear 40 supported for rotation on an arbor 41, which may be larger than the gear 38 as shown, or smaller, and in fact of a size having any number of teeth, odd or even, as long as it has the same pitch for proper drive from the indexing gear. Thus, the indexing gear 38 may mesh with a great range of work gears. By providing an indexing gear having 10 teeth, the 36° setting will index it one tooth at a time. For one-tooth-at-a-time indexing, a 30-tooth gear would be provided for the 12° setting and a 60-tooth gear for the 6° setting. The angles mentioned are merely suggestive and may be varied in an obvious manner on different installations of my indexing mechanism to accommodate other numbers of teeth, such as 9° for a 40-tooth gear, 15° for a 24 or 48-tooth gear, 18° for a 20 or 40-tooth gear, 24° for a 15 or 30-tooth gear and so on. A hole 42 is also provided in the mounting plate 14 for the purpose of receiving the pin 32 during initial set-up of the indexing mechanism at which time hardened stops 44, 46, 48 and 50 are ground to insure the proper travel of the indexing arm 22 during its oscillations through the angles such as 6°, 12°, 18° or 36° indicated.

The means for oscillating the indexing arm 22 comprise a cylinder 52, a piston 54 therein and a piston rod 56. The cylinder is pivoted at 58 to the mounting plate 14 and at 60 to the indexing arm. It is provided with a down port D and an up port U as shown diagrammatically in FIGS. 3 and 4.

Associated with the indexing arm 22 is a limit switch LS2 mounted on the arm 20. This limit switch is adapted to be operated in the up (solid line position) of the indexing arm for a purpose which will hereinafter appear. The indexing mechanism as thus far described is enclosed in a housing 62 secured to the mounting plate 14 as shown in FIG. 2.

A gear tooth hardening machine of the general character to which my indexing mechanism is applied is shown in Jones Patent No. 2,857,154. The Jones patent illustrates a pawl mechanism engageable with the teeth of the work gear itself and operable to index it and also shows a gear hardening element in the form of an inductor. In diagrammatic FIGS. 3 and 4 such an inductor is shown at 64 and 64ᵃ, 64 being an end view thereof and 64ᵃ a side view thereof in the same figures, a cross section of the gear 40 in relation to the inductor being shown at 40ᵃ. Preferably the element 64 is in the form of an intensifier of the kind disclosed in another Jones Patent No. 2,810,054.

The gear hardening element 64 is supported by a machine head 66 which as shown at 66ᵃ and 66ᵇ is movable so that the element 64ᵃ traverses the width of the work gear 40ᵃ and thereby the length of a tooth (or a trough between two teeth) thereof. During the hardening of all of the teeth, traversal is first toward the right as shown in FIG. 3, then the work gear 40 is indexed one tooth (or more if desired), then the head traverses to the left as in FIG. 4, then the work gear is indexed whereupon the cycle is repeated, and this alternate traversal and indexing of the gear is continued until all of the teeth of the work gear are hardened.

The head 66 carries an aligning element 68 in the form of a guide ball adapted to traverse a gear tooth trough next to the gear hardening element 64 for the final accurate positioning of the gear teeth so that when the element 64 traverses the trough between two gear teeth its surfaces adjacent those of the teeth will have a specified clearance of a few thousandths of an inch which is an important factor in efficient high frequency induction heating for the purpose of hardening gear teeth and the like.

To index the work gear to a position closely adjacent that required for traversal of the aligning ball 68 I provide the type of indexing mechanism herein disclosed as distinguished from a pawl type as shown in the first above-mentioned Jones patent. At the same time the mechanism I disclose is readily adjustable to different degrees of indexing movement of the indexing arm 22 by adjustment of the pin 32 to the various bushings 36 as required. This accuracy is initially provided in the grinding of the hardened stops 44, 46, 48 and 50, three of which may first be ground and assembled after which the required height for the fourth one may be measured while the index angle setting arm 20 is adjusted to the zero position (pin 32 in hole 42) and the fourth stop ground within a specified few thousandths of an inch of that dimension. Accordingly, when the indexing arm 22 is subsequently operated from one stopped position to another it will index the work gear 40 very closely to the desired angle and what slight backlash there is between the indexing gear 38 and the work gear 40 added to what clearance there may be between adjacent stops 44 and 46 will permit the slight final adjustment of the work gear to the proper position by coaction of the aligning ball 68 with the teeth thereof as the gear hardening element 64 starts to pass through the teeth of the gear.

FIGS. 3 and 4 illustrate a cycle start switch (CS), a cycle counter (CC), solenoid valve (SV), a clutch relay (CR) with current "ON" (clutch disengaged and indicated "C out") and current "OFF" (clutch engaged and indicated "C in"), limit switches LS3 and LS4 actuated by a projection 70 on the head 66 as soon as the aligning ball coacts with two adjacent gear teeth, and limit switches LS5 and LS6 actuated by the head 66 at opposite limits of its reciprocation. The aligning element 68 is also shown at 68ᵃ in the same figures. Arrows designated (A), (B), (C), (D), (E), (F), (G) and (H) are also shown to indicate a sequence of operations.

PRACTICAL OPERATION

Referring to FIG. 3 the cycle start switch (CS) when manually operated locks in until the cycle count is completed, and actuates the solenoid valve (SV) through the cycle counter (CC) to perform operation (A) causing pressure fluid such as compressed air or oil under pressure to enter the up port U of the cylinder 52 to swing the indexing arm 22 upwardly (arrow $a$ in FIG. 3) from the dot-and-dash line position of FIG. 1 to the full line position thereof during which time the clutch is engaged so the gear 38 is indexed. In FIG. 3 the arm is shown in its initial position for the start of the cycle.

Completion of the upward swing of the indexing arm 22 actuates the limit switch LS2 to effect start of the operation (B), the head 66 moving from position 66ᵃ toward position 66ᵇ. When the aligning ball 68 reaches a position about half way entered into a tooth trough of the work gear 40ᵃ the projection 70 actuates the limit switch LS3 to cause operation (C) which is energization of the clutch relay CR to disengage the clutch 23–24, and to cause operation (D) which is energization of the solenoid valve (SV) so that it is actuated according to operation (E) to cause pressure fluid to enter the down port D of the cylinder 52 which results in the indexing arm 22 being returned (arrow $b$ in FIG. 4) to the initial position of FIG. 3 while the clutch is disengaged so that the arm does not rotate the indexing shaft 16 and thereby the gear 38 at this time. Thus the arm 22 is oscillated upwardly to index the gear 38 and thereby the work gear 40 at least one tooth, then remains stationary until traverse (B) causes the alignment ball to enter the trough between two teeth of the work gear at which time the clutch is caused to become inoperative and the index arm is returned to its initial position ready for the next indexing operation.

The head 66 continues its right-hand traverse according to operation (F) in FIG. 3 so that the gear hardening element 64ᵃ passes completely through the tooth trough of the gear 40ᵃ. The final position 66ᵇ results in the limit switch LS5 being operated which stops operation (F) or the traversal of the head 66 toward the right, causes operation (G) which deenergizes the clutch relay (CR) and results in the clutch becoming engaged or "in," and causes operation (H) which actuates the solenoid valve (SV) through the cycle counter (CC) to cause pressure fluid to flow according to operation (A) to the up port U of the cylinder 52.

This restarts the cycle of operations when the limit switch LS2 is contacted by the arm 22 (FIG. 4) causing the head 66 to traverse to the left according to operation (B'). Operations (D') and (C') occur when the limit switch LS4 is actuated, and operations STOP (F'), (G') and (H') occur when the limit switch LS6 is actuated according to operation (F'). Thus the second traverse is toward the left from position 66ᵇ to position 66ᵃ. Operations (D'), (C'), (F') and (G') are similar to operations (D), (C), (F) and (G), respectively, already described. Operation (H') is similar to (H), and through the cycle counter (CC) and the solenoid valve (SV) causes operation (A) to again start repeating the cycle by traverse (B) and (F) of the head 66 from position 66ᵃ to position 66ᵇ as in FIG. 3. Thus the machine will cycle—first traversing the head 66 to the right and then to the left, with indexing of the work gear 40 between each traverse and until the cycle counter (CC) has counted out the cycles which, of course, correspond to the teeth of the gear 40 as preset on the cycle counter before the start of the gear hardening operation. At that time the cycle counter effects stoppage of the entire operation which was initiated by the cycle start switch CS.

Suitable high frequency and control electric circuits are provided to accomplish the desired energization of the inductor 64 and cycling as above described, and hydraulic and/or pneumatic circuits are also provided. Circuitry of this kind is standard in the machine tool art and need not be gone into in detail. I may mention, however, that the usual arrangement in the solenoid valve SV is provided whereby, when fluid flows to the down port (D), it is exhausted from the up port (U) and vice versa. The limit switches are adjustable in the usual way for length of traverse and other variables, and may control suitable circuits for rapid and slow traverse, "heat-on" and "heat-off" for the inductor and other functions which form no part of my present invention.

One of the important features of my invention is the utilization of an indexing gear 38 which may be used without further adjustment for indexing all different sizes of work gears such as mentioned in the foregoing specification. The drawings illustrate the indexing of one tooth at a time regardless of the size of the work gear and whether it is smaller or larger than the indexing gear. The cycle counter CC is preset to the number of teeth in the work gear to take care of these variations. The 36° setting for the indexing gear 38 will index two teeth at a time if the gear has 20 instead of 10 teeth and such an indexing and work gear combination can be indexed one tooth at a time by changing the pin 32 to the 18° bushing 36.

Sometimes it is desirable, in order to cut down the localized build-up of heat during hardening to index two or more teeth at a time so that alternate teeth or every third tooth are successively hardened, and at the end of one revolution the machine continues for another revolution to harden the teeth that were not hardened the first revolution, the cycle counter having been set to the number of teeth in the work gear the same as though one tooth at a time were being hardened. In the case of every third tooth, three revolutions are necessary. The work gear may have an odd number of teeth in which case the hardening of alternate teeth will in two revolutions effect hardening of all the teeth when the cycle counter CC is set to the number of teeth in the work gear.

Thus, the use of an indexing gear meshing with the work gear instead of having the work gear directly on the indexing shaft 16 permits one indexing gear to properly index work gears of any number of teeth regardless of the size of the work gear, and to index one, two or more teeth at a time as desired.

For the indexing of work gears which have spiral teeth, the clutch C, being released as soon as the ball 68 enters the tooth trough, provides rotation of the work gear by the aligning ball during such traversal. In other cases, gear teeth are closed on one end and the indexing mechanism may be adjusted to traverse toward the closed end without heat, and then without indexing the gear, to traverse toward the open end with heat. Thereupon the work gear is indexed for a similar operation in the next tooth trough and so on. The basic index gear and clutch operation remain the same and are versatile as indicated for operation on unusual types of gears.

From the foregoing specification it will be obvious that I have provided an indexing mechanism which eliminates the usual pawl method of indexing and provides a rugged mechanism to replace the same. The combination of oscillating indexing arm 22 and clutch connection, together with the control means for actuating the clutch connection at the proper times, and the provision of limit switches responsive to the oscillations of the indexing arm and to the reciprocations of the work head 66 provide a means for the proper sequence of operations of the various elements to accomplish a number of hardening cycles corresponding to the number of teeth in the gear being hardened. At the end of the cycle counting by the device (CC) the machine is automatically shut off and conditioned for the next cycle start operation after the hardened gear has been removed and replaced by a second one to be hardened. Thereupon the cycle start switch CS may again be operated to start the hardening of the teeth of the second gear in the machine.

While I have described indexing at the rate of one or more gear teeth at a time combined with hardening the trough of two adjacent teeth, it is to be understood that these are not to be construed as limitations as the gear can be indexed two or more teeth at a time where an intensifier is designed to pass through two gear teeth troughs, three or more teeth at a time for a three-trough design and so on in which case the cycle counter is set for one-half or one-third the number of gear teeth. Changes of this kind as well as others in the construction and arrangement of the parts of my indexing mechanism may be made without departing from the real spirit and purpose of my invention, and it is my intention to cover by my claims any modified forms of structure or use of mechanical equivalents which may reasonably be included within their scope.

I claim as my invention:

1. In an indexing mechanism for a gear tooth hardening machine in which a work gear is supported for rotation, the indexing mechanism is adapted to rotate it at least one tooth at a time and the gear hardening element traverse the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, said control means being responsive to traversals of said gear hardening element and to the completion of the oscillations of said indexing arm in one direction.

2. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, said control means including a limit switch which is responsive to the completion of a traversal of said gear hardening element to stop such traverse and render said clutch operative, and effect oscillation of said indexing arm in said one direction.

3. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, said operative connection from said indexing shaft to said work gear comprising an indexing gear on said indexing shaft meshing with the work gear.

4. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, a cycle counter being provided and operatively connected with said control means to recycle said gear hardening element and said indexing mechanism the number of times required to harden all the teeth of the work gear, and thereupon operable to stop the cycling of the machine.

5. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, an aligning element being provided for said gear hardening element and said control means including a limit switch actuated upon entry of said aligning element into a tooth trough to render said clutch inoperative and effect oscillation of said indexing arm in said other direction.

6. Indexing mechanism according to claim 5 wherein said means to oscillate said indexing arm is pressure fluid operated, valve means is provided for controlling the flow of pressure fluid thereto, and said control means effects operation of said valve means.

7. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing shaft operatively connected to the work gear, an oscillatable indexing arm for rotating said indexing shaft, means to oscillate said indexing arm, a clutch connection between said indexing arm and said indexing shaft, stop means to limit the oscillations of said arm to that required to rotate said gear at least one tooth at a time, and control means operable to render said clutch operative when said indexing arm is oscillated in one direction and inoperative when oscillated in the other direction, said control means including a limit switch which is responsive to the completion of a traversal of said gear hardening element to render said clutch operative and effect oscillation of said indexing arm in said one direction.

8. In an indexing mechanism for a gear tooth hardening machine in which a work gear is supported for rotation, the indexing mechanism is adapted to rotate it at least one tooth at a time and the gear hardening element traverses the width of the gear and thereby the length of a tooth thereof each indexing cycle; said indexing mechanism comprising an indexing gear meshing with the work gear, an oscillatable indexing arm for rotating said indexing gear, means to oscillate said indexing arm, a clutch connection between said indexing arm and said indexing gear, stop means to limit the oscillations of said indexing gear to that required to rotate the work gear at least one tooth at a time, first control means responsive to traversal of said gear hardening element to a predetermined position to render said clutch inoperative and move said indexing arm in one direction, and second control means responsive to completion of the traversal of said gear hardening element to render said clutch operative and effect movement of said indexing arm in the other direction.

9. Indexing mechanism according to claim 8 wherein said means to oscillate said indexing arm is pressure fluid operated, valve means is provided for controlling the flow of pressure fluid thereto, and said first and second control means effect operation of said valve means.

10. Indexing mechanism according to claim 8 wherein said control means is responsive to traversals of said gear hardening element and to the completion of the oscillations of said indexing arm in one direction.

11. Indexing mechanism according to claim 8 wherein a cycle counter is provided and operatively connected with said second control means to recycle said gear hardening element and said indexing mechanism the number of times required to harden all the teeth of the work gear.

12. Indexing mechanism according to claim 8 wherein an aligning element is provided for said gear hardening element and said first control means includes a limit switch actuated upon entry of said aligning element into a tooth trough to render said clutch inoperative and effect oscillation of said indexing arm in said one direction.

13. Indexing mechanism according to claim 8 wherein said second control means includes a limit switch which is responsive to the completion of a traversal of said gear hardening element to stop such traversal, render said clutch operative and effect oscillation of said indexing arm in said other direction.

14. Indexing mechanism according to claim 8 wherein said second control means includes a limit switch which is responsive to the completion of a traversal of said gear hardening element to render said clutch operative and effect oscillation of said indexing arm in said other direction.

References Cited

UNITED STATES PATENTS

| | | | |
|---|---|---|---|
| 1,426,552 | 8/1922 | Cross | 74—817 X |
| 2,958,619 | 11/1960 | Frost | 266—4 X |
| 3,026,101 | 3/1962 | Pethybridge | 266—5 X |
| 3,188,745 | 6/1965 | Gates et al. | 74—125.5 X |

J. SPENCER OVERHOLSER, *Primary Examiner.*

R. S. ANNEAR, J. D. HOBART, *Assistant Examiners.*